(12) United States Patent
Hoke et al.

(10) Patent No.: US 9,003,298 B2
(45) Date of Patent: Apr. 7, 2015

(54) WEB PAGE APPLICATION CONTROLS

(75) Inventors: Tom Hoke, Sammamish, WA (US);
Lawrence Waldman, Seattle, WA (US);
Amy Lin, Bothell, WA (US); Johnny Campbell, Renton, WA (US); Shahar Prish, Redmond, WA (US); Daniel Battagin, Bellevue, WA (US); Harrison Gordon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 210 days.

(21) Appl. No.: 13/418,489

(22) Filed: Mar. 13, 2012

(65) Prior Publication Data

US 2012/0173963 A1 Jul. 5, 2012

Related U.S. Application Data

(63) Continuation-in-part of application No. 12/887,003, filed on Sep. 21, 2010, and a continuation-in-part of application No. 12/986,473, filed on Jan. 7, 2011.

(51) Int. Cl.
*G06F 3/00* (2006.01)
*G06F 3/0488* (2013.01)
*G06F 17/30* (2006.01)
*G06F 3/048* (2013.01)

(52) U.S. Cl.
CPC ...... *G06F 3/04883* (2013.01); *G06F 17/30905* (2013.01)

(58) Field of Classification Search
CPC . G06F 17/211; G06F 17/212; G06F 17/2247; G06F 17/30905
USPC .......... 715/745, 810, 834, 841, 863
See application file for complete search history.

(56) References Cited

U.S. PATENT DOCUMENTS

| 5,717,939 | A | 2/1998 | Bricklin et al. |
| 7,234,107 | B1 | 6/2007 | Aoki et al. |
| 7,469,381 | B2 | 12/2008 | Ording |
| 7,519,223 | B2 | 4/2009 | Dehlin et al. |

(Continued)

OTHER PUBLICATIONS

"International Search Report", Mailed Date: Jun. 27, 2013, Application No. PCT/US2013/027547, Filed Date: Feb. 25, 2013, pp. 10.

(Continued)

*Primary Examiner* — Nicholas Augustine
(74) *Attorney, Agent, or Firm* — Damon Rieth; Jim Ross; Micky Minhas (57) ABSTRACT

A web page behavior control (WPBC) menu is provided on a rendered web page for enabling a user to perform actions on a portion of the web page content such as customizing, editing, sharing, analyzing, exporting, and/or annotating the content. The user may automatically activate the menu by performing a unique gesture on the rendered web page and/or by selecting a portion of the web page content. The WPBC menu may provide a list of applications which may be selected for modifying and managing the portion of selected web page content. The application may provide full functionality for managing the web page content in a separate user interface and/or directly on the rendered web page. Furthermore, manipulation of data presentation on the rendered web page such as table properties of a spreadsheet may be enabled through natural gestures.

18 Claims, 10 Drawing Sheets

(56) References Cited

U.S. PATENT DOCUMENTS

| | | | |
|---|---|---|---|
| 7,676,763 B2* | 3/2010 | Rummel | 715/841 |
| 7,730,425 B2* | 6/2010 | de los Reyes et al. | 715/835 |
| 8,245,156 B2* | 8/2012 | Mouilleseaux et al. | 715/834 |
| 8,279,174 B2* | 10/2012 | Jee et al. | 345/157 |
| 8,392,890 B2* | 3/2013 | Miller | 717/127 |
| 8,549,432 B2* | 10/2013 | Warner | 715/834 |
| 8,601,389 B2* | 12/2013 | Schulz et al. | 715/786 |
| 2003/0011638 A1* | 1/2003 | Chung | 345/808 |
| 2004/0125130 A1 | 7/2004 | Flamini et al. | |
| 2005/0278647 A1* | 12/2005 | Leavitt et al. | 715/765 |
| 2007/0143715 A1 | 6/2007 | Hollins et al. | |
| 2007/0266342 A1 | 11/2007 | Chang et al. | |
| 2008/0005678 A1* | 1/2008 | Buttner et al. | 715/744 |
| 2008/0036743 A1* | 2/2008 | Westerman et al. | 345/173 |
| 2009/0019063 A1 | 1/2009 | Gandhi et al. | |
| 2009/0100345 A1* | 4/2009 | Miller | 715/738 |
| 2009/0158190 A1* | 6/2009 | Higginson | 715/773 |
| 2009/0271735 A1 | 10/2009 | Anderson et al. | |
| 2009/0307762 A1 | 12/2009 | Cudd, Jr. | |
| 2009/0309849 A1* | 12/2009 | Iwema et al. | 345/173 |
| 2009/0327964 A1* | 12/2009 | Mouilleseaux et al. | 715/834 |
| 2010/0192103 A1* | 7/2010 | Cragun et al. | 715/834 |
| 2010/0235794 A1 | 9/2010 | Ording | |
| 2011/0154268 A1* | 6/2011 | Trent et al. | 715/863 |
| 2011/0163968 A1 | 7/2011 | Hogan | |

OTHER PUBLICATIONS

"Touch", Retrieved at <<http://msdn.microsoft.com/en-us/library/windows/desktop/cc872774.aspx>>, Retrieved Date: Feb. 1, 2012, pp. 18.

Office Action received for U.S. Appl. No. 12/887,003, mailed Apr. 4, 2014 and filed on Sep. 21, 2010.

* cited by examiner

WEB PAGE APPLICATION CONTROLS

CROSS REFERENCE TO RELATED APPLICATIONS

This application is a continuation-in-part (CIP) of co-pending U.S. patent application Ser. No. 12/887,003, filed Sep. 21, 2010 and U.S. patent application Ser. No. 12/986,473, filed Jan. 7, 2011, commonly assigned herewith. The parent applications are hereby incorporated by reference in their entirety.

BACKGROUND

Web applications provide a wide variety of services and data to users over networks. Data is collected, processed, and stored in different locations. Web applications retrieve that data, format it for presentation, and provide it to browsing applications on client devices for rendering web pages. Some web pages may be static, where the data is non-interactive. Others may provide some interactivity such as additional information through links or activation of web-based modules. In general, however, web pages present data in a format and amount that is decided by the web page author.

Data in conventional web pages generally has limited interactivity as defined by the web page author restricting its usefulness to users. Even if the page author explicitly provides export or "data feed" functionality for the content, users have to perform several relatively complicated operations to access and modify the data, such as navigating to external applications and using traditional input methods to manage the data presented on the rendered web page. Additionally, providing one presentation of the data on the web page itself and enabling the user to interact with the data provided in a richer presentation is a difficult undertaking. Furthermore, despite gesture and touch based interactions becoming increasingly popular, natural gesture based interactions with web pages are typically limited to selection of web page controls and settings.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a web page behavior control (WPBC) menu on a rendered web page for enabling a user to perform actions on a portion of the web page content such as customizing, editing, sharing, analyzing, exporting, and/or annotating the content through gesture and/or touch based input. The WPBC menu may be automatically activated by detecting a unique gesture on the rendered web page and/or by selection of a portion of the web page content. The WPBC menu may provide a list of applications which may be selected for modifying and managing the portion of selected web page content. The application may provide full functionality for managing the web page content in a separate user interface and/or directly on the rendered web page. Furthermore, manipulation of data presentation on the rendered web page such as table properties of a spreadsheet may be enabled through natural gestures.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, a web page behavior control (WPBC) menu is provided on a rendered web page for enabling a user to perform actions on a portion of the web page content such as customizing, editing, sharing, analyzing, exporting, and/or annotating the content. The WPBC menu may provide a list of applications which may be selected for modifying and managing the portion of selected web page content. The application may provide full functionality for managing the web page content in a separate user interface and/or directly on the rendered web page using gesture and touch input. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable storage media.

Throughout this specification, the term "platform" may be a combination of software and hardware components for web pages and data presentation through web pages. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

According to embodiments, a touch-enabled or gesture-enabled input device and display screen may be utilized for receiving input from a user over a user interface. The touch input device and display screen may utilize any technology that allows touch or gesture input by a user to be recognized. For example, some technologies may include, but are not limited to: heat, finger pressure, high capture rate cameras, infrared light, optical capture, tuned electromagnetic induction, ultrasonic receivers, transducer microphones, laser rangefinders, shadow capture, and the like. The user interface of a touch-enabled or gesture-enabled device may display web page content, applications for managing web page content, and a menu of actions for interacting with the web page content. A user may use gestures to interact with the user interface to manage the web page content. User gestures may be captured through physical interaction with the device (touch) or through optical or similar capture of the user without the user directly touching the device, for example, though a video capture device. An example of such input devices is Kinect® by Microsoft Corporation of Redmond, Wash. The menu of actions for interacting with the web page content may be used to provide access to applications for managing and editing the web page content, such as documents, tables, spreadsheets, charts, lists, and any content (e.g., audio, video, etc.) The touch-enabled or gesture-enabled input device may make use of features specific to touch or gesture enabled computing devices, but may also work with a traditional mouse and keyboard. A touch input and/or gesture, such as a tap or swipe action as used herein may be provided by a user through a finger, a pen, a mouse, or similar device, as well as through predefined keyboard entry combinations or a voice command.

Figure 1:
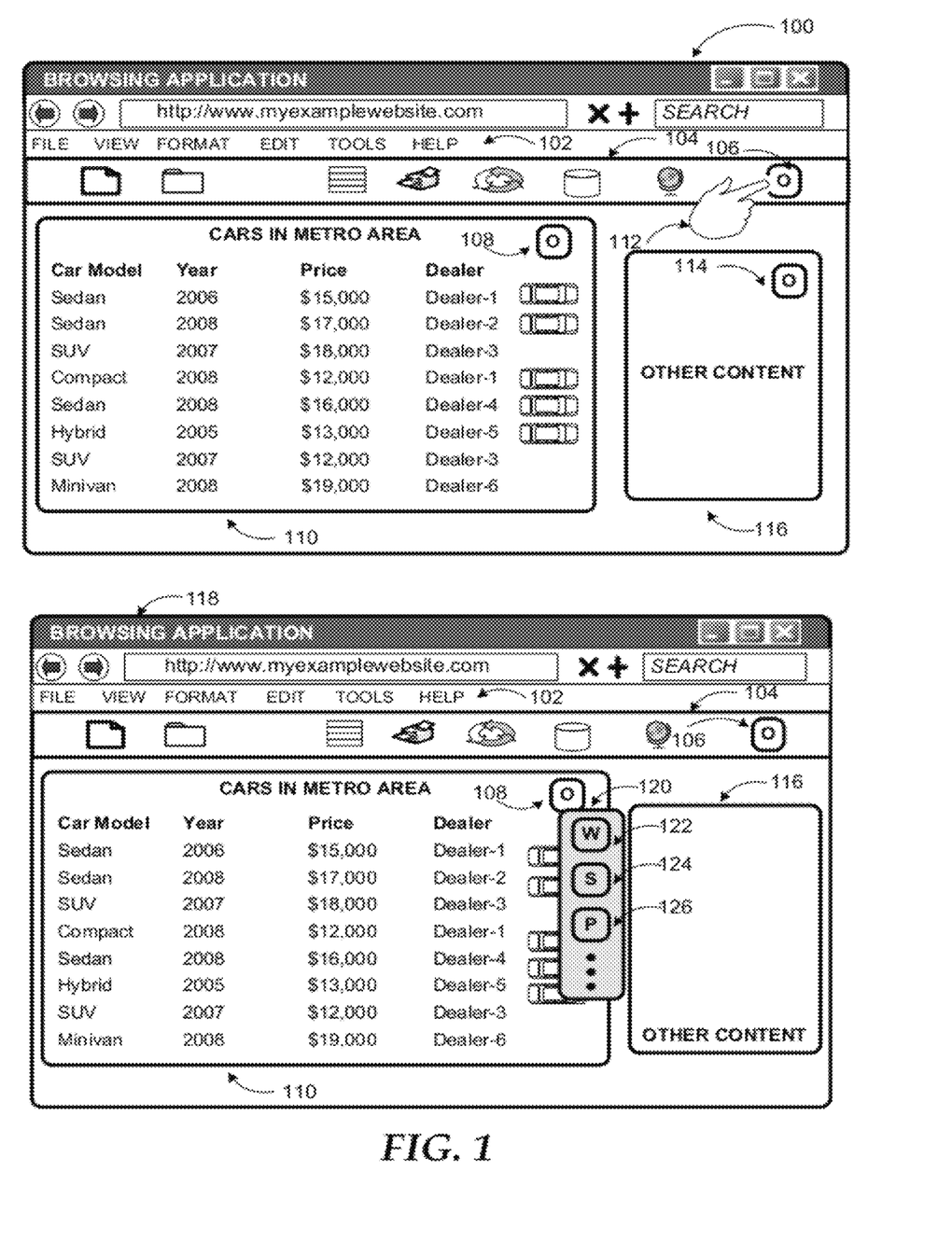
FIG. 1 illustrates activation and presentation of an example web page behavior control menu of available actions.

FIG. 1 illustrates activation and presentation of an example web page behavior control menu of available actions, according to embodiments. Example web page 100 includes standard web page elements such as menu items 102, graphical controls 104, and two example content portions 110 and 116. Interactivity with data presented on the web page 100 is generally limited to the boundaries set by the author of the web page (or the web application providing the web page). For example, content portion 110 presents a list of cars, their years of manufacture, prices, etc. The web page may provide additional information through links on some (or all) of the data, but the user viewing the page is limited to the format and configuration of the list. Furthermore, the user is unable to view further analyses of the data in form of results, other tables, or charts, cannot modify/sort/filter/format individual items on the list or annotate the data unless the functionality is provided by the author of the web page.

A web page according to embodiments may include one or more web page behavior enhancement (WPBE) control elements (106, 108, and 114), which may enable the user to perform various actions on the presented data and other data (e.g. implied data that is available to or from the web application presenting the web page but not displayed or related data that is stored in other locations). WPBE control element 106 is an example control element that is associated with the entire web page. Thus, actions provided through the WPBE control element 106 are applicable to the entire web page. WPBE control elements 108 and 114 are associated with content portions 110 and 116, respectively. Thus, these elements provide actions applicable to their respective content portions. While the actions provided by the WPBE control elements may be distinct for each content portion, they may also be the same.

The web page 100 may typically be rendered by a browsing application on a client device, which may include any computing device such as a personal computer, a tablet computer, a laptop, a mobile device such as a smart phone, a server, a vehicle mount computing device, and others that are connected to a web server through a network. The example computing devices may be touch or gesture-enabled, such that the user may interact with the web page 100 rendered on the browsing application of the client device through touch actions and/or optically (or otherwise) captured gestures. Example touch actions and gestures may include a tap or swipe action which may be provided by the user through a finger, a pen, a mouse, touch-sensitive interface, optical capture, or similar device, as well as through predefined keyboard entry combinations or a voice command.

A second example web page 118 illustrates activation of the WPBE control element 106 for a list of available actions to the user. The user may activate the WPBE control element 106 using a touch or gesture action 112. For example, the user may tap, swipe or similarly gesture towards the WPBE control element 106 in order to activate the WPBE control element 106. Other actions may also be utilized for selecting the WPBE element, and the action may be provided as previously discussed employing a finger, a pen, a mouse, or similar gesture capture device. Upon activation of the WPBE control element 106 by the user, a web page behavior control (WPBC) menu (textual, graphical, or combination) 120 of available actions may be provided to the user. For example, the WPBC menu 120 of available actions may include icons for various applications through which the content may be displayed, edited, customized, analyzed, etc. Examples of such applications may include word processing application 122, spreadsheet application 124, and presentation application 126. Other examples of applications may include drawing applications, browsing applications, content aggregation applications and similar ones. These applications may be local, web-based, or embedded.

The user may select one of the applications presented on the WPBC menu 120 for managing and editing the web page content portion 110 associated with the WPBE control element 106. Upon selection of one of the applications 122, 124, 126, a richer/more interactive representation of the content may be presented to the user in place on the rendered web page 100 or on a separate user interface. For example, a Hypertext Markup Language (HTML) table may be replaced with a spreadsheet table allowing the user to sort, filter, format, analyze, and chart the displayed data, among other things. In another example, upon selection of one of the applications from the WPBC menu 120, the selected application may be launched in a separate user interface for enabling the user to interact with the content and data with the full functionality of the selected application. After editing the content in the separate application user interface, the user may save the modified content and return to the web page 118 where the modified content may be displayed.

In some embodiments, a suitable application for displaying, editing, customizing, analyzing, etc. the content may be activated directly through an action (touch, gesture, other) on the WPBE control element 108 or upon selection of at least a portion of the displayed content on the web page without necessitating display of the WPBC menu 120. For example, in response to selection of a portion of a table and/or a gesture over the WPBE control element (or a unique gesture), a spreadsheet application 124 may be activated with the selected portion of the table as content. The user may then perform tasks on the selected content with full functionality of the spreadsheet application 124. Of course other types of content and applications such as word processing application 122, spreadsheet application 124, presentation application 126, a drawing application, a browsing application, a content aggregation application may also be employed.

Figure 2:
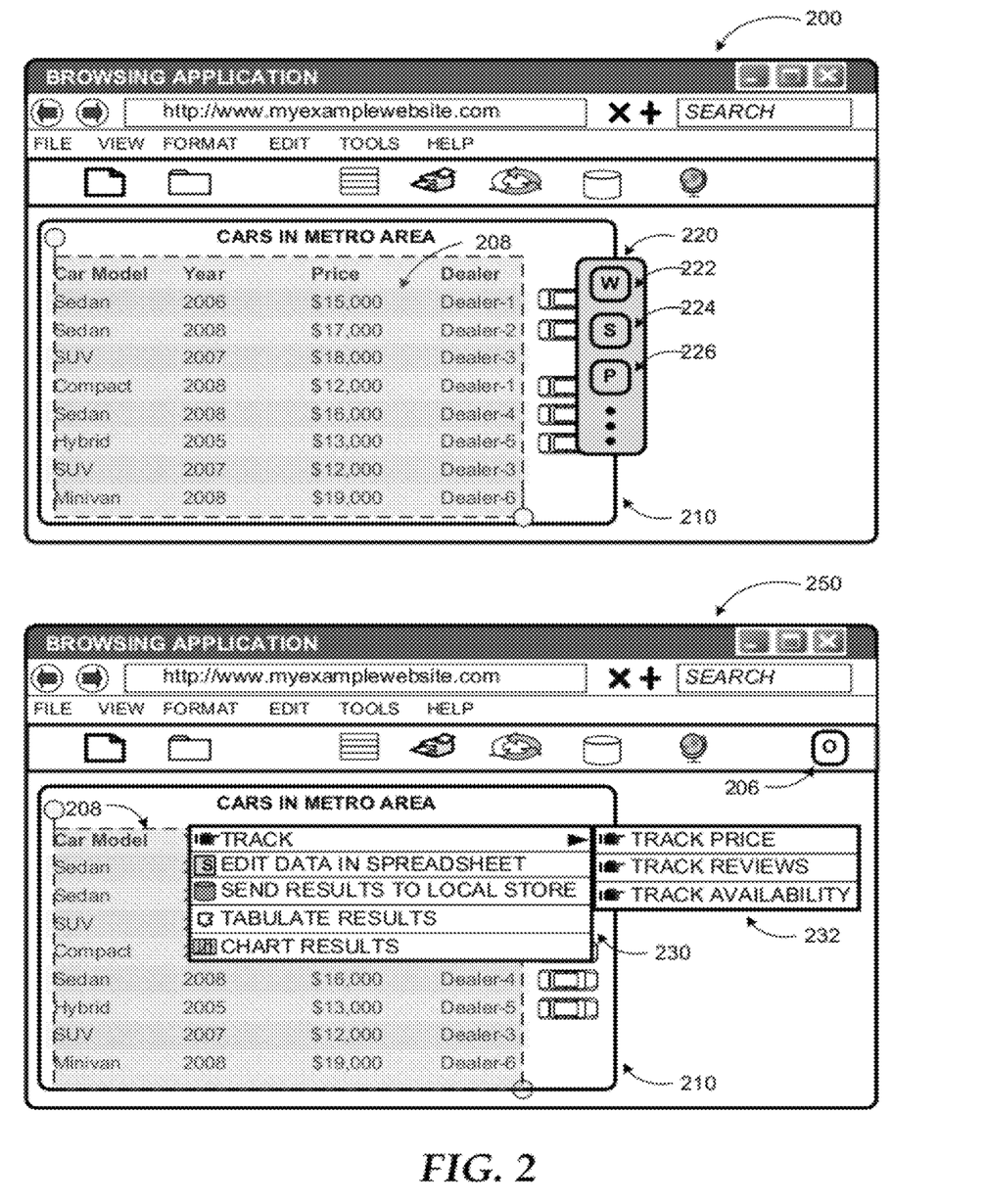
FIG. 2 illustrates example activation of a web page behavior control menu of available items based on selected content.

FIG. 2 illustrates example activation of a web page behavior control menu of available items based on selected content, according to embodiments. Example web page 200 illustrates a dynamic approach in providing the user with available actions. As previously described, example web page 200 includes standard web page elements such as menu items, graphical controls, and example web page content 210. The user may select a portion 208 of the web page content 210 which the user may wish to modify and manage. Upon detection of the selection of a portion 208 of the web page content 210, a web page behavior control (WPBC) menu (textual, graphical, or combination) 220 of available actions may be automatically provided to the user over the user interface, which may enable the user to perform various actions on the selected portion 208 of the web page content 210 including presented data and other data (e.g. implied data that is available to or from the web application presenting the web page but not displayed or related data that is stored in other locations).

The provided WPBC menu 220 is an example menu associated with the selected portion 208 of the web page content 210. Thus, actions provided through the WPBC menu 220 are applicable to the selected portion 208 of the web page content 210. The WPBC menu 220 of available actions may include icons for various applications through which the content may be displayed, edited, customized, analyzed, etc, such as word processing application 222, spreadsheet application 224, and presentation application 226, and other content aggregation applications. These applications may be local, web-based, or embedded.

The user may select one of the applications presented on the WPBC menu 220 for managing and editing the selected portion 208 of the web page content 210. Upon selection of one of the applications 222, 224, 226, the content may be presented in a user interface associated with the selected application presenting the user with a richer/more interactive representation of the content in place on the rendered web page 200 or on a separate user interface.

Second example web page 250 illustrates another approach in providing the user with available actions for interacting with a selected portion 208 of the web page content 210. In this scenario, a dropdown or hover-on menu 230 of available actions may be provided in response to detection of a selection of a portion 208 of the web page content. The dropdown or hover-on menu 230 of available actions may also be provided in response to activation of a WPBE control element 206 which may be associated with the web page or with a portion of content displayed on the web page, as previously described in conjunction with FIG. 1. One or more additional levels of menus (e.g. menu 232) may be displayed in response selection of one of the items on the primary menu. Of course, other forms of presentation such as audio may also be employed in presenting the user with available actions. The presented actions on the primary menus of FIG. 2 as well as the items on secondary menus (or user interfaces) may be determined based on capabilities of the web application presenting the web page, capabilities of the user's local browser application or system, and/or user's preferences/usage history.

Figure 3:
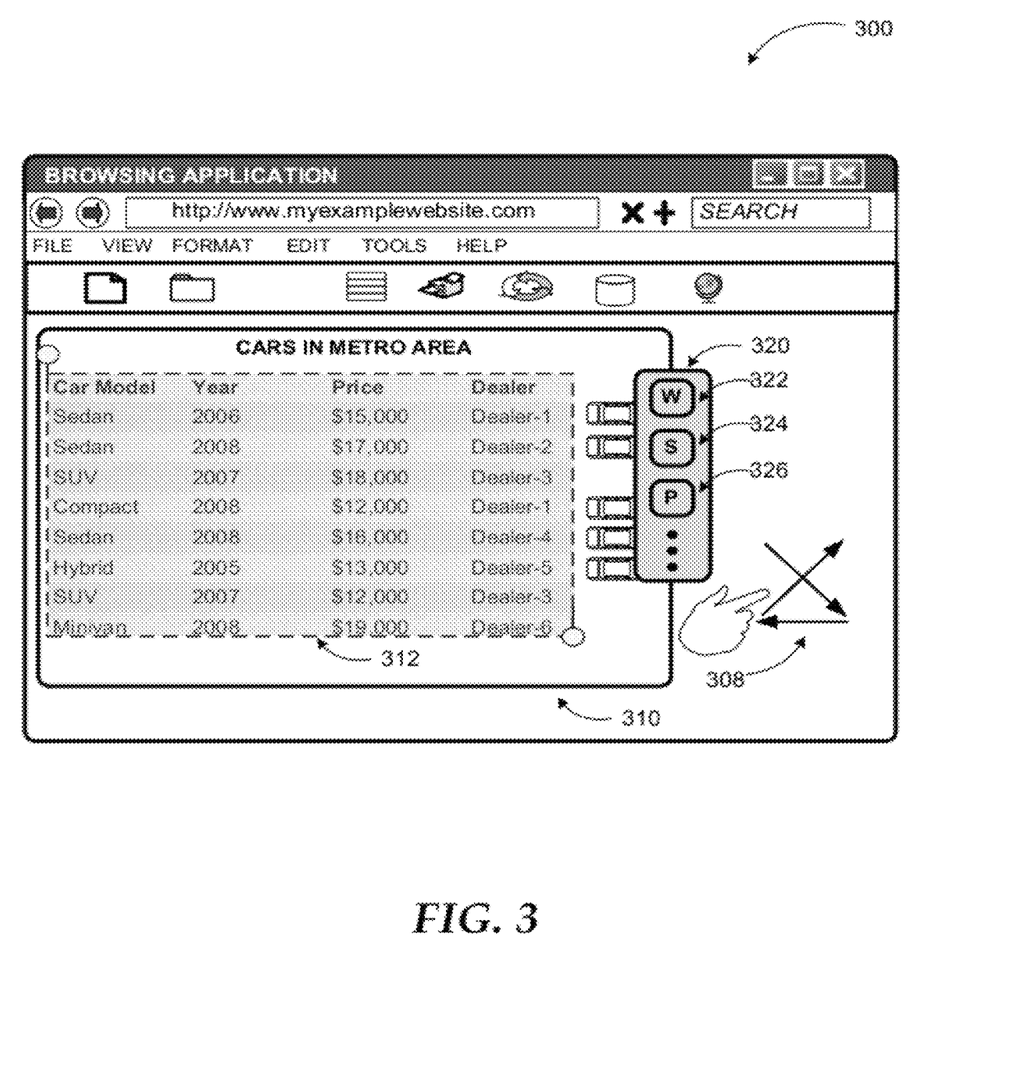
FIG. 3 illustrates an example of activation of a web page behavior control menu using a gesture action.

FIG. 3 illustrates an example of activation of a web page behavior control menu using a gesture action. As shown on example web page 300 displaying web page content 310, a WPBC menu 320 for managing and editing the web page content 310 may be provided for enabling the user to interact with the web page content 310. In an example embodiment, the WPBC menu 320 may be activated by a unique gesture 308 or touch action by the user on the user interface of the web page display. Unique gesture 308 may be any gesture which may be used to activate the WPBC menu 220 and not confused with other gestures for interacting with the web page. The unique gesture 308 may further be configurable to be any unique gesture action specifically for activating the WPBC menu.

In an example embodiment, the user may select a portion 312 of the displayed web page content 310 on the web page 300, and after selection of the portion 312, the user may perform the unique gesture 308 anywhere on the user interface display for activating the WPBC menu 320 associated with the selected portion 312 of the web page content 310. WPBC menu 320 may include icons 322, 324, and 326 representing a word processing application, a spreadsheet application, and a presentation application, for example. Additionally, the user may perform the unique gesture 308 over or next to the web page content 310 which the user wishes to modify and manage, and the unique gesture 308 automatically activate the WPBC menu 320 associated with the web page content 310 over which the unique gesture 308 was performed. As previously described, the WPBC menu 320 may present a list of applications and/or actions which the user may select to enable the user to perform various actions on the web page content 310.

Figure 4:
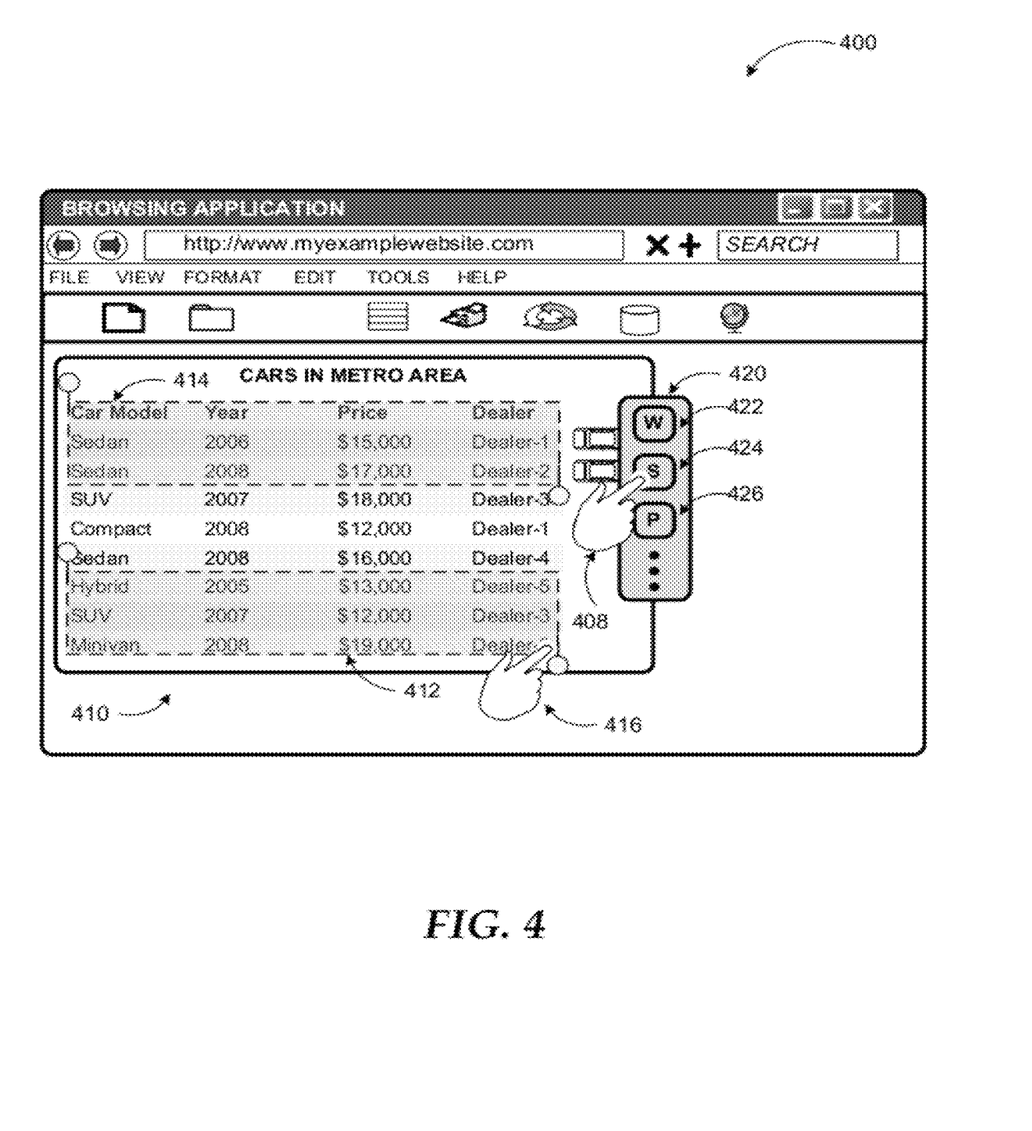
FIG. 4 illustrates an example of selection of multiple content portions of a web page on a multi-touch enabled device.

FIG. 4 illustrates an example of selection of multiple content portions of a web page on a multi-touch or multi-gesture enabled device, according to embodiments. Example web page 400 is similar to web pages 200 or 300 where the web page is rendered by a browsing application on a gesture-enabled client device, such that the user may interact with the content on the web page 100 through touch actions and gestures. The example gesture-enabled client device may be multi-gesture enabled such that the user may use two or more input methods, such as two hands, for selecting, gathering and interacting with web page content 410. Example touch actions and gestures may include a tap, swipe, and hold action which may be provided by the user through a finger, a pen, a mouse, or similar gesture capture device, as well as through predefined keyboard entry combinations or a voice command.

In a system according to embodiments, the user may select and gather multiple portions of content for sending to an application for managing the web page content 410. The multi-gesture enabled device may enable the user to select two or more portions 412, 414 of web page content 410 with which the user wishes to interact using a first input method or action to select and hold a portion of the web page content 410, and to select the desired application and/or action from the WPBC menu 420 of available actions using a second input method or action.

In an example embodiment, the user may select a first portion 414 of the web page content 410 and a second portion 412 of the web page content 410 which the user wishes to modify and/or manage using a first selection 416. While the user has selected one or more portions of the web page content 410 using a first selection 416 to select and hold the selected portions 412, 414, the WPBC menu 420 may be automatically provided upon detection of the selection. The user may be enabled to use a second selection 408 with the user's other hand (or other input method) to select from the actions presented on the WPBC menu 420. As discussed previously, upon detection of a selection of an application and/or action on from the WPBC menu 420, the selected application may launch in a separate user interface displaying the selected content in a richer/more interactive representation, or alternatively, a richer/more interactive representation of the selected content may be displayed in place on the rendered web page. WPBC menu 420 may include icons 422, 424, and 426 representing a word processing application, a spreadsheet application, and a presentation application, for example.

Figure 5:
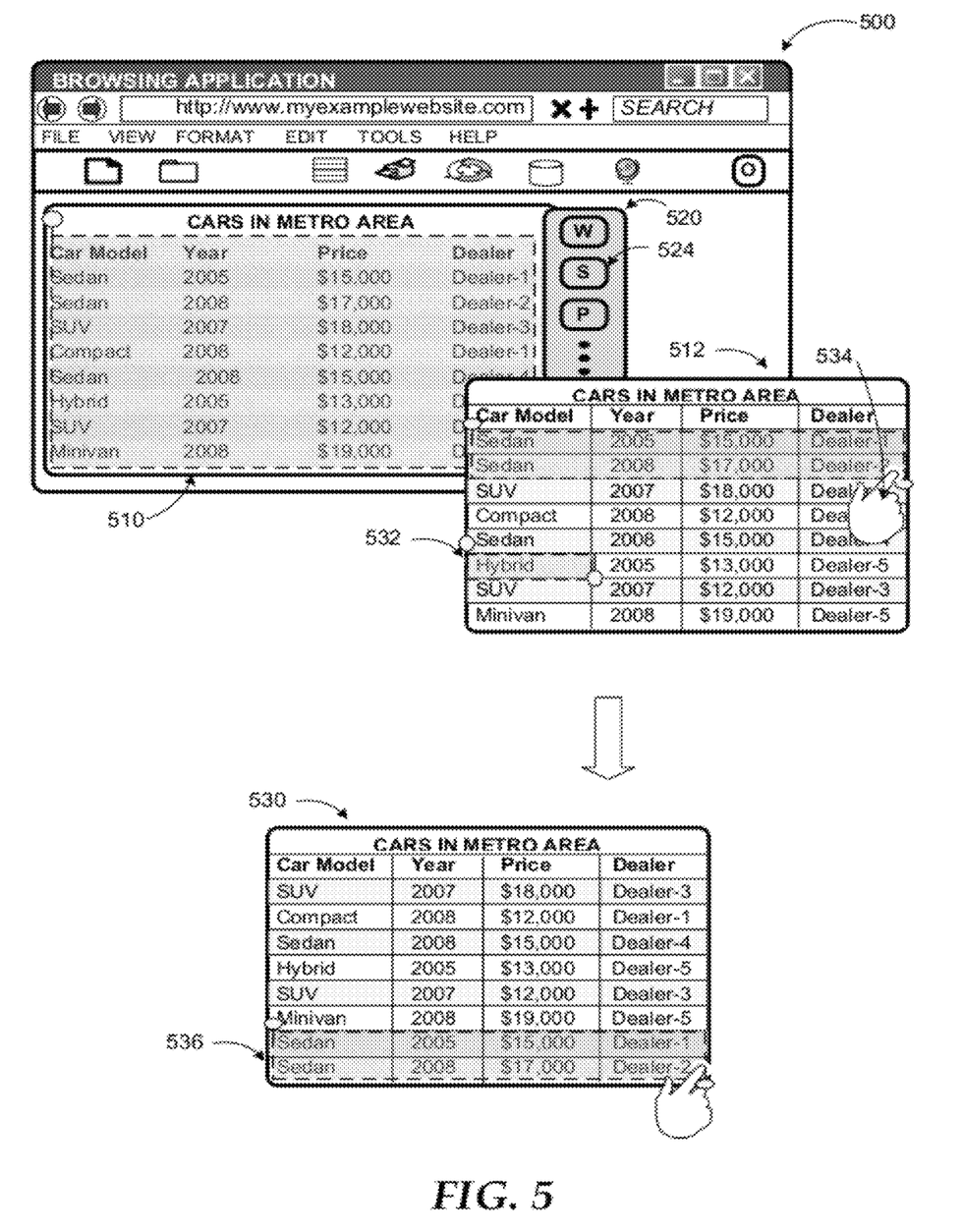
FIG. 5 illustrates an example gesture action for modifying and moving selected content of a web page.

FIG. 5 illustrates an example gesture action for modifying and moving selected content of a web page, according to embodiments. As previously discussed, example web page 500 includes standard web page elements and one or more content portions. Interactivity with data presented on the web page 500 is generally limited to the boundaries set by the author of the web page (or the web application providing the web page). For example, content portion 510 presents a table with a list of cars, their years of manufacture, prices, etc. The web page may provide additional information through links on some (or all) of the data, but the user viewing the page is limited to the format and configuration of the list, and the user may not be able to edit, modify, or interact with the table or the content with the full functionality of a relevant application. Furthermore, the user is unable to view further analyses of the data in form of results, other tables, or charts, cannot modify/sort/filter/format individual items on the list or annotate the data unless the functionality is provided by the author of the web page.

In a system according to embodiments, the web page 500 may transform the rendered content portion 510 such that the web page may have the full functionality of a relevant application for enabling the user to interact with the web page content, including tables, charts, documents, graphics and other content. Enabling full application functionality on the content portion 510 may enable the user to perform various actions on the presented content and other data directly on the web page without navigating to an external application.

Web page 500 illustrates an example of enabling full application functionality on the web page content, according to some embodiments. In the illustrated scenario, the selected content portion 510 of the table of the list of cars may be transformed into a spreadsheet 512 containing the same data as on the web page. The content portion 510 may be transformed utilizing the WPBC menu 520, which may be automatically displayed upon detection of a selection of content on the web page, in response to a unique gesture on the web page, and/or in response to activation of a WPBE control element as previously described. The user may select the relevant application from the presented WPBC menu and the web page content may be automatically transformed in response to the selection.

In an example scenario, the user may select a portion of the web page content, and from the automatically displayed WPBC menu, the user may select the spreadsheet application 524 for editing the table in the web page content, which may automatically transform the content portion 510 into the spreadsheet 512. Transforming the content portion 510 to the spreadsheet 512 may enable the user to perform spreadsheet actions directly on the web page content as if the content were open in a spreadsheet application. For example, the user may select and edit 532, format, sort, analyze, and perform other spreadsheet functions and actions on the data displayed in the content portion 510. The transformed spreadsheet 512 may be displayed as a separate user interface over the web page content, or alternatively the web page content itself may be transformed such that the transformed spreadsheet may take the place of the content portion 510 where it is originally rendered.

In an additional embodiment, when the web page content is transformed to enable full application functionality, the user may be enabled to perform actions on the data such as selecting, moving, merging, filtering, and similar actions as if the content were open in a spreadsheet application. For example, in the illustrated scenario, the user may select 534 rows of the table in the spreadsheet 512 using a tap and hold gesture, for example, and may drag the selected rows to move them to a new position 536 forming a new table 530. The new table 530 may replace the selected web page content where it is originally rendered. Similar actions, such as selecting, editing, and moving items may be performed on text and graphic items, and combinations of items included in the web page content, as well.

Figure 6:
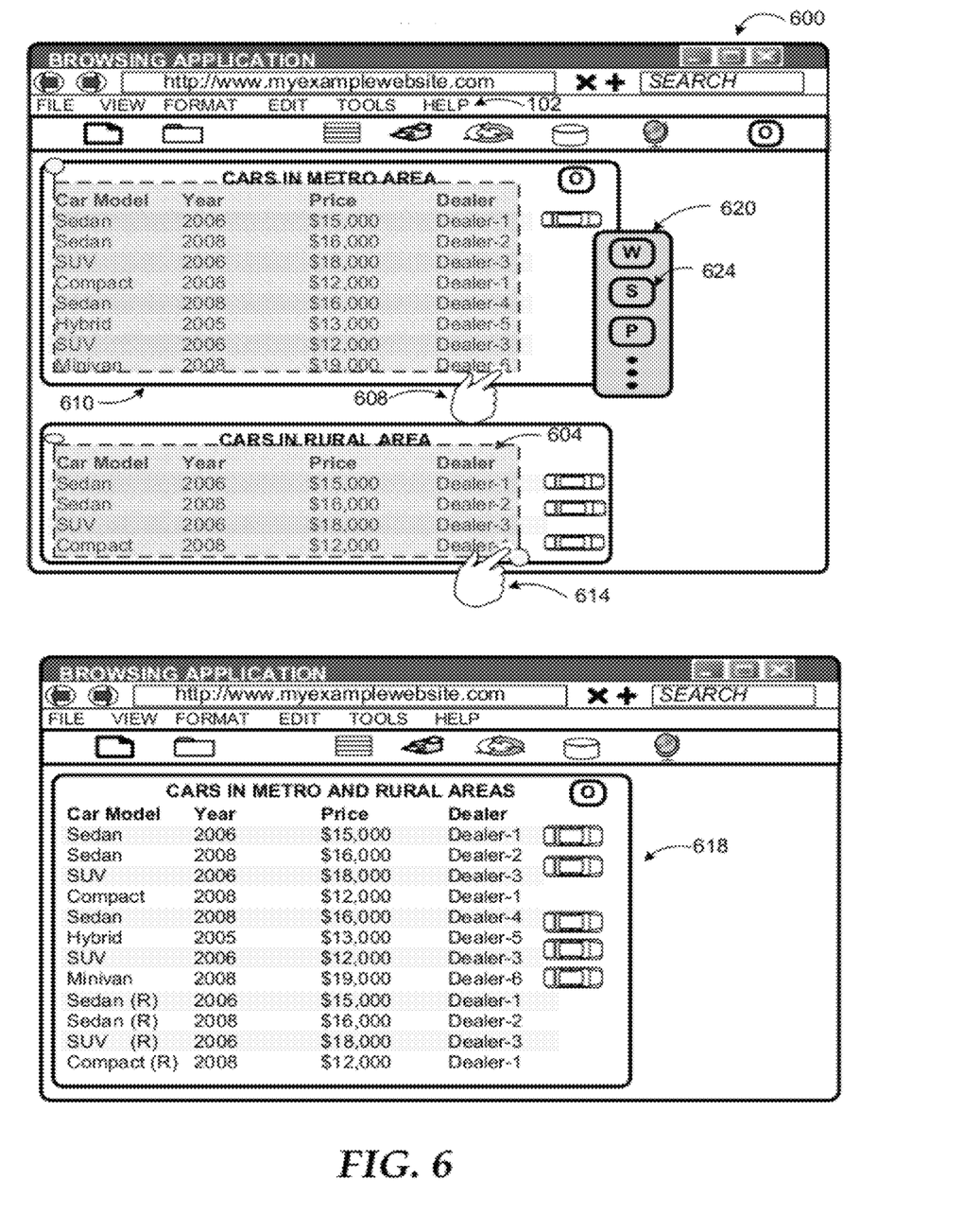
FIG. 6 illustrates an example gesture action for merging selected content of a web page on a multi-touch enabled device.

FIG. 6 illustrates an example gesture action for merging selected content of a web page, according to embodiments. As previously discussed a web page according to embodiments may transform the rendered web page content such that the web page may have the full functionality of a relevant application for enabling the user to directly interact with the web page content, including tables, charts, documents, graphics and other content. Web page 600 illustrates an example scenario enabling full application functionality on the web page content 610, according to some embodiments. When the web page content is transformed to enable full application functionality, the user may be enabled to select, move, merge, filter, and perform other similar application actions on the data on the web page directly.

In the illustrated scenario, the user may select two or more portions of web page content 604, 610 which may be a web table containing a list of cars and related information. In response to the selection, a WPBC menu 620 of available actions for the selected web page content may be automatically displayed. Upon selection of the content and selection 612 of an action from the WPBC menu 606, such as spreadsheet application 624, the selected portions of web page content 604, 610 may be automatically transformed into a spreadsheet containing the same data as on the web page and having full spreadsheet functionality. Once transformed into a spreadsheet enabling full spreadsheet functionality, the user may be enabled to use touch input or gestures to modify and manipulate the selected web page content directly on the web page.

Further, the web page content may be rendered on a multi-gesture enabled device such that the user may use two or more input methods, such as two hands, for selecting, gathering and interacting with web page content. In the illustrated scenario the user may use one hand or a first action 608, to select and hold a first portion of the transformed web page content and may use the other hand, or a second action 614, to select a second portion of the transformed web page content data. The user may hold and drag the two selected portions of the web page content 604, 610 together in order to merge the two selected portions forming a new table 618. The new table 618 with the merged content portions may replace the web page content where it is originally rendered. Similar actions, such as selecting, moving and merging items may be performed on text and graphic items, and combinations of items, as well. The first and second actions 608 and 614, as well as any other gestures may be captured through a touch-based interface or through optical or other indirect capture mechanism without the user physically touching the computing device.

Figure 7:
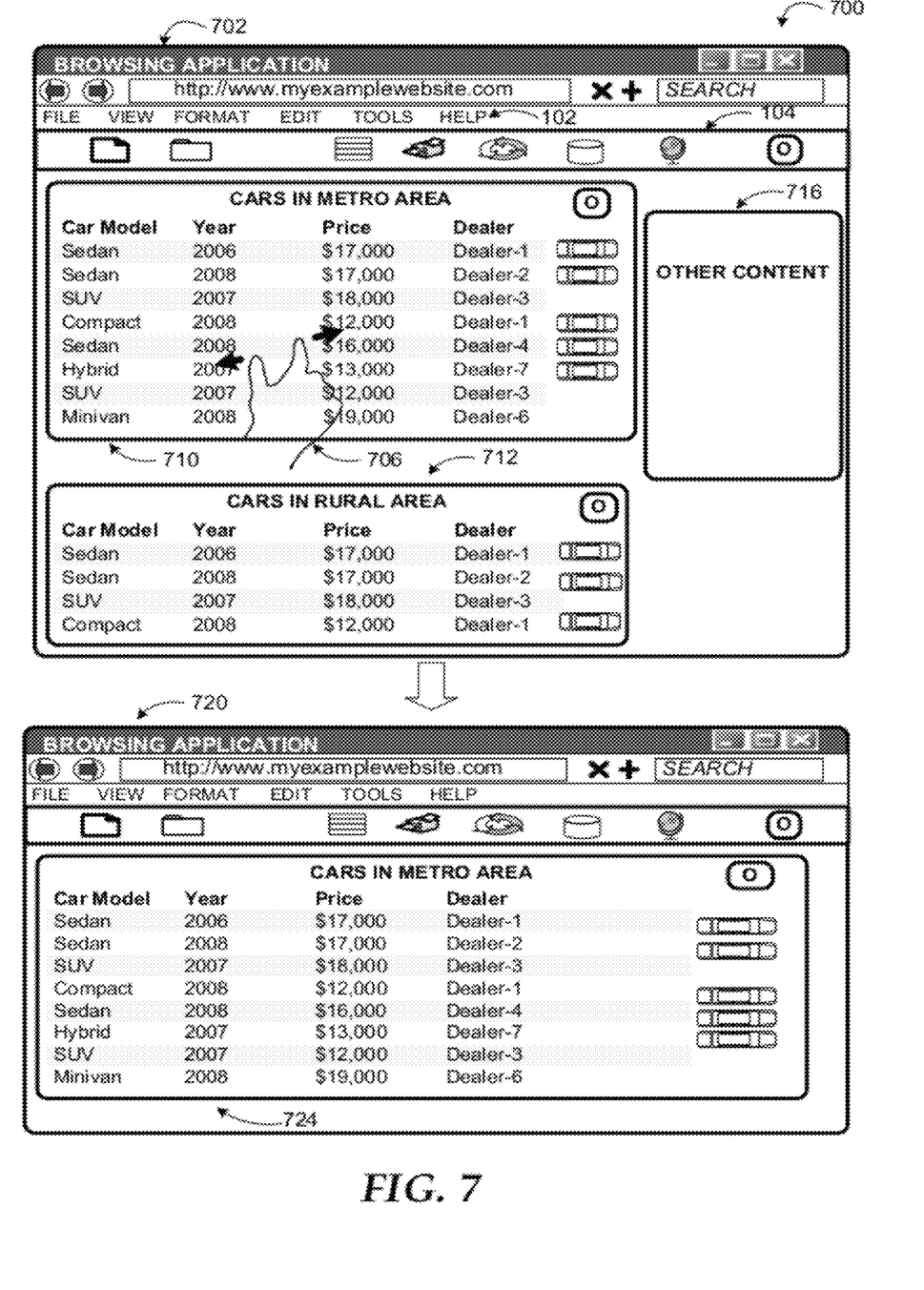
FIG. 7 illustrates an example zooming gesture performed on a web page

FIG. 7 illustrates an example zooming gesture performed on a web page, according to embodiments. As previously discussed a web page according to embodiments may transform the rendered web page content such that the web page may have the full functionality of a relevant application for enabling the user to interact with the web page content directly, including tables, charts, documents, graphics and other content. Enabling full application functionality on web page content may enable the user to perform various actions on the presented content and other data directly on the web page without navigating to an external application. Some example actions may include selecting and editing, formatting, sorting, analyzing, moving, merging, filtering, zooming, and performing other similar actions on the data.

In an example embodiment, as demonstrated in diagram 700, web page 702 may present one or more portions of web page content 710, 712, 716. The web page content may be transformed to enable full application functionality directly on the web page directly, such that the user may interact with the data using touch input and gestures to modify and manipulate the web page content. Some example gestures for interacting with a spreadsheet application may include for example, a swipe gesture, a cut/paste gesture, an insert gesture, a vortex gesture, a grip gesture, a chart gesture, a trend line gesture, a comment gesture, a zoom gesture, a sort gesture, an undo/redo gesture, and the like may be received.

In the illustrated scenario, web page 702 displays the transformed web page content 710, 712, 716 before zooming, and web page 720 displays a zoomed view after performing a zoom gesture 706 operation. According to an embodiment, a zoom in operation may be detected when a user spreads two of their fingers apart as indicated by zoom gesture 706. A zoom out gesture may be detected when a user closes two of their fingers. In the example illustration, when the user performs a zoom gesture 706 over a portion of the web page content 710, the zoomed view web page 720 magnifies the view such that the user interface displays the portion 724 of the web page content that is zoomed in on and the rest of the web page content is outside of the viewing window. The user may also perform a zoom out gesture on the zoomed view web page 720 to return to the original web page 702 before zooming.

The example user interface elements and interactions discussed in FIG. 1 through FIG. 7 are for illustration purposes only and do not constitute a limitation on embodiments. A web page behavior control menu for managing content on a rendered web page may be implemented with other user interfaces, interface elements, presentations, and configurations using the principles described herein.

Figure 8:
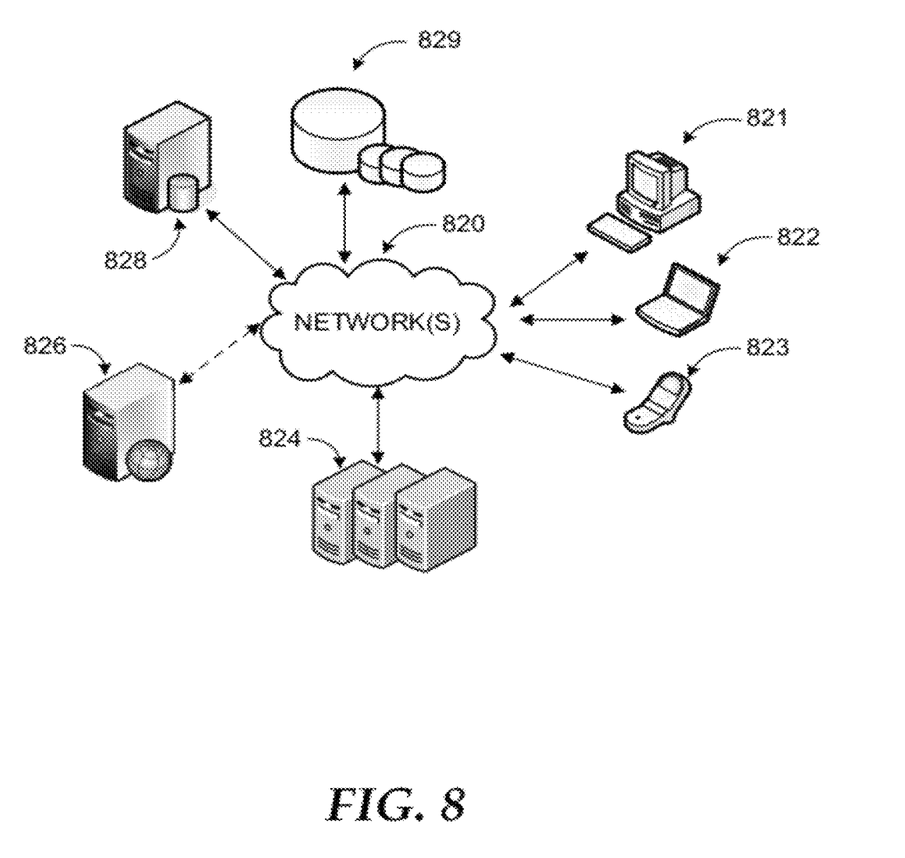
FIG. 8 is a networked environment, where a system according to embodiments may be implemented.

FIG. 8 is an example networked environment, where embodiments may be implemented. A platform providing a web page behavior control menu and associated actions may be implemented via software executed over one or more servers 824 or a single server (e.g. web server) 826 such as a hosted service. The platform may communicate with client applications on individual computing devices such as a smart phone 823, a laptop computer 822, or desktop computer 821 ('client devices') through network(s) 820.

As discussed above, one or more WPBE control elements may be embedded on web pages by the author or by a local browser on the client devices 821-823. Upon activation, the a WPBC menu may present a list of available actions and applications to the user, and upon user selection of an application and/or action from the menu, the user may be enabled to customize, edit, analyze, store, etc. the rendered web page with the full functionality of the selected application. The user may use touch input and gestures to modify and manage the web page content where it is rendered on the web page directly, and in a separate user interface.

While local versions of the modified web page content may be stored at any of the client devices 821-823, content may also be stored remotely (e.g. in data stores 829) and updated as the original web page content changes. The platform providing the web page may store at and retrieve from data stores 829 directly or through database server 828 data associated with the web site (e.g. published, implied, or related content).

Network(s) 820 may comprise any topology of servers, clients, Internet service providers, and communication media. A system according to embodiments may have a static or dynamic topology. Network(s) 820 may include secure networks such as an enterprise network, an unsecure network such as a wireless open network, or the Internet. Network(s) 820 may also coordinate communication over other networks such as Public Switched Telephone Network (PSTN) or cellular networks. Furthermore, network(s) 820 may include short range wireless networks such as Bluetooth or similar ones. Network(s) 820 provide communication between the nodes described herein. By way of example, and not limitation, network(s) 820 may include wireless media such as acoustic, RF, infrared and other wireless media.

Many other configurations of computing devices, applications, data sources, and data distribution systems may be employed to implement a web page behavior control menu and web page behavior enhancement controls. Furthermore, the networked environments discussed in FIG. 8 are for illustration purposes only. Embodiments are not limited to the example applications, modules, or processes.

Figure 9:
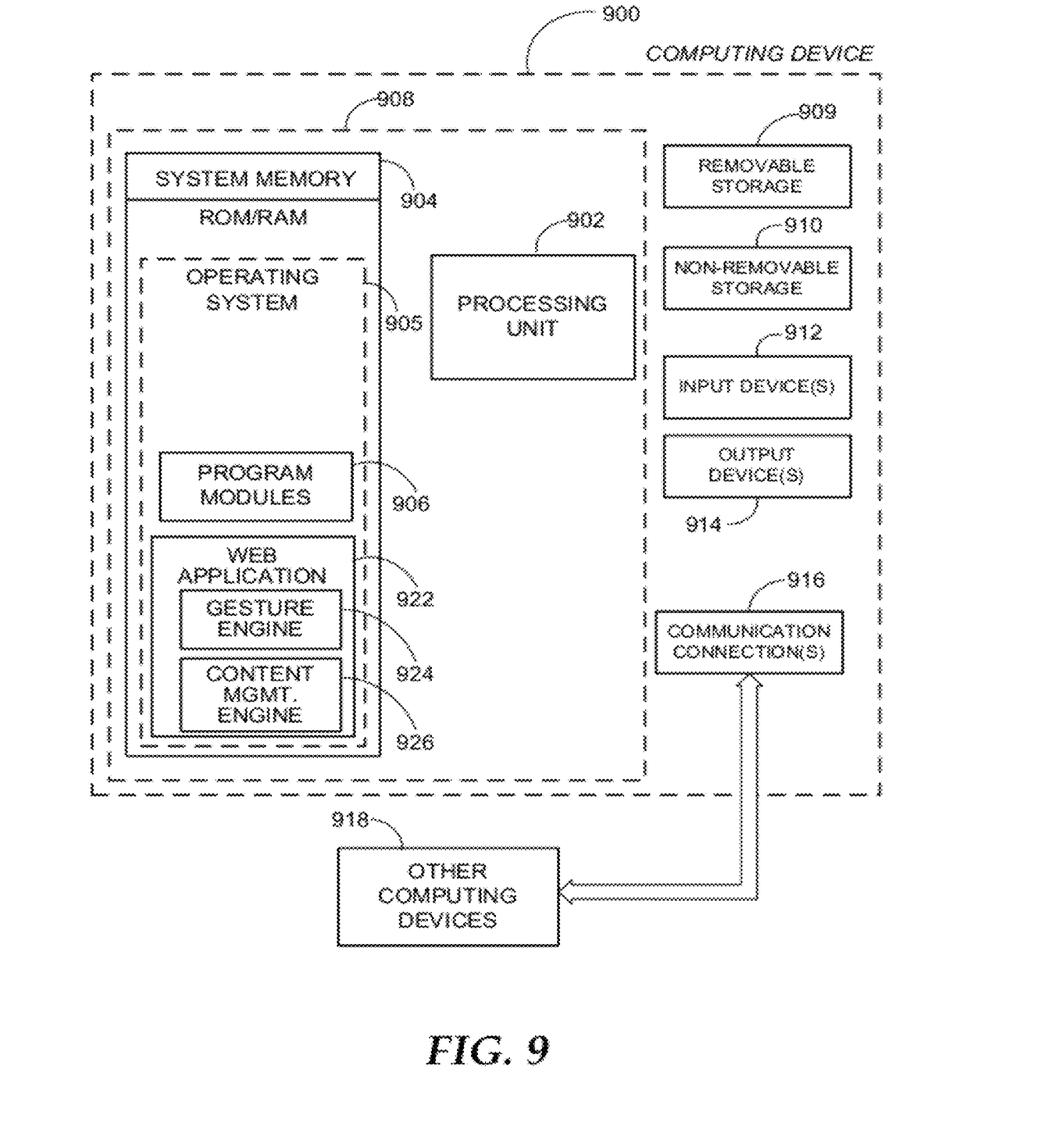
FIG. 9 is a block diagram of an example computing operating environment, where embodiments may be implemented.

FIG. 9 and the associated discussion are intended to provide a brief, general description of a suitable computing environment in which embodiments may be implemented. With reference to FIG. 9, a block diagram of an example computing operating environment for an application according to embodiments is illustrated, such as computing device 900. In a basic configuration, computing device 900 may be a server executing a web application and include at least one processing unit 902 and system memory 904. Computing device 900 may also include a plurality of processing units that cooperate in executing programs. Depending on the exact configuration and type of computing device, the system memory 904 may be volatile (such as RAM), non-volatile (such as ROM, flash memory, etc.) or some combination of the two. System memory 904 typically includes an operating system 905 suitable for controlling the operation of the platform, such as the WINDOWS® operating systems from MICROSOFT CORPORATION of Redmond, Wash. The system memory 904 may also include one or more software applications such as program modules 906, web application 922, gesture engine 924 and content management engine 926.

Web application 922 may be any application or service presenting textual, graphic, audio, video, and other data to users through their client browsing applications as web pages. Web application 922 may provide a WPBE control element embedded into a web page and a WPBC menu enabling users to select portions of content on the web page and to manage and modify the web content with the full functionality of a relevant application. The user may be able to modify and manage the web page content using touch input and gestures to select, move, edit, filter merge, and perform other similar actions on the web content through the gesture engine 924 as discussed previously. Additionally content management engine 926 may transform the rendered web page content such that the web page may have the full functionality of a relevant application for enabling the user to interact with the web page content, including tables, charts, documents, graphics and other content. This basic configuration is illustrated in FIG. 9 by those components within dashed line 908.

Computing device 900 may have additional features or functionality. For example, the computing device 900 may also include additional data storage devices (removable and/or non-removable) such as, for example, magnetic disks, optical disks, or tape. Such additional storage is illustrated in FIG. 9 by removable storage 909 and non-removable storage 910. Computer readable storage media may include volatile and nonvolatile, removable and non-removable media implemented in any method or technology for storage of information, such as computer readable instructions, data structures, program modules, or other data. System memory 904, removable storage 909 and non-removable storage 910 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer readable storage media may be part of computing device 900. Computing device 900 may also have input device(s) 912 such as keyboard, mouse, pen, voice input device, touch input device, gesture capture device, and comparable input devices. Output device(s) 914 such as a display, speakers, printer, and other types of output devices may also be included. These devices are well known in the art and need not be discussed at length here.

Computing device 900 may also contain communication connections 916 that allow the device to communicate with other devices 918, such as over a wireless network in a distributed computing environment, a satellite link, a cellular link, and comparable mechanisms. Other devices 918 may include computer device(s) that execute web services, analysis services, data storage services, and comparable devices. Communication connection(s) 916 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 10:
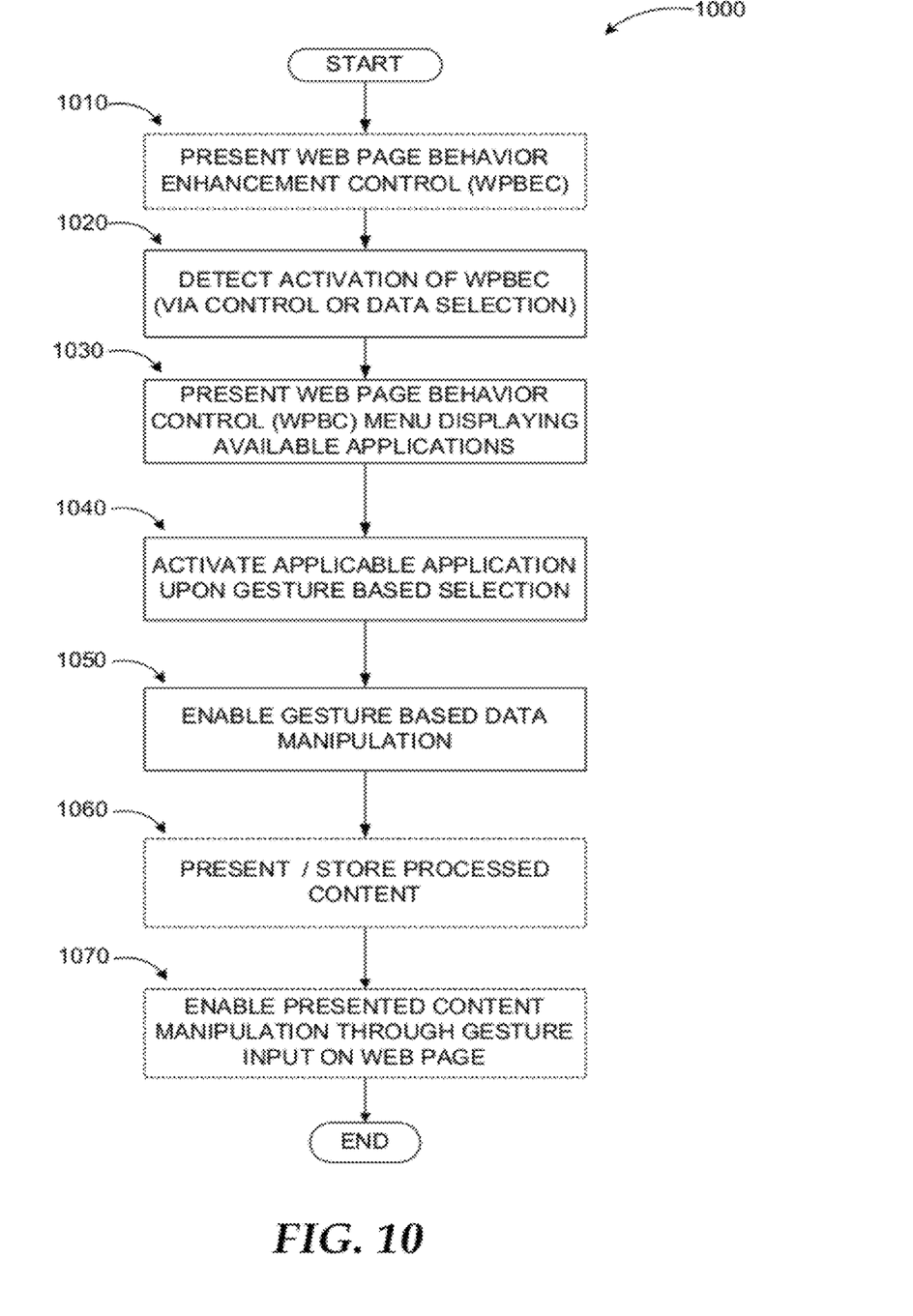
FIG. 10 illustrates a logic flow diagram for a process of providing web page behavior enhancement control menu according to embodiments.

FIG. 10 illustrates a logic flow diagram for process 1000 of providing web page behavior enhancement controls according to embodiments. Process 1000 may be implemented by a web application, gesture engine and content management engine executed on a web server or client device.

Process 1000 begins with operation 1010, where the web page with a WPBE control element is presented. At operation 1020 activation of the WPBEC may be detected. The WPBEC may be activated by a user action on the WPBEC such as a tap or swipe. In some embodiments the WPBE control element is not presented, and activation of the WPBEC may be implied automatically upon detection of a user selection of a portion of content displayed on the web page. Upon detecting activation of the WPBE control element, a web page behavior control menu may be presented at operation 1030. The WPBC may present a list of available actions and applications for interacting with the selected web page content. The WPBC menu may also provide the list of available actions upon activation of the WPBE control element based on a capability of the browser rendering the web page, a capability of the web application, user preferences, and/or usage pattern(s).

At operation 1040, the user may select a relevant action and/or application for interacting with the selected content using a touch or gesture action, and the selected application may be activated. At operation 1050, touch or gesture based data manipulation may be enabled such that the user may use touch input and gestures to perform actions to modify and manage the selected portion of the web page content. Example actions may be selecting, editing, filtering, moving, merging, zooming, and other similar actions for managing content.

At operation 1060, the selected portion of the web page content that has been enabled for gesture based manipulation may be presented on the original rendered web page or as a separate user interface. When the user modifies the web page content in the separate user interface, the modified web page content may be stored and the stored web page content updated as content associated with the original rendered web page changes. At optional operation 1070, the web page content may be transformed to enable the web page content to be manipulated through gesture input directly on the web page. Transforming the web page content may enable full application functionality on the web page content for enabling the user to perform various actions on the presented content directly on the web page without navigating to an external application.

The operations included in process 1000 are for illustration purposes. A web page behavior control menu for managing content on a rendered web page according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing gesture based manipulation of presented content on a rendered web page, the method comprising:
   presenting a web page behavior enhancement (WPBE) control element on a rendered web page;
   in response to detecting activation of the WPBE control element through a gesture,
      presenting one or more actions to allow interactions with the rendered web page, wherein the one or more actions are determined based on one or more of capabilities of a web application that presents the rendered web page, capabilities of a browser application that renders the rendered web page, a user preference associated with the rendered web page, and a usage history associated with the rendered web page;
      activating a suitable application for managing the presented content; and
      presenting a web page behavior control (WPBC) menu displaying one or more suitable applications for manipulating the presented content on the rendered web page;
      detecting selection of an application from the WPBC menu;
      activating the selected application for managing the presented content;
      transforming a selected portion of the presented content to enable modification of the selected portion of the presented content directly on the rendered web page with functionality of the selected application, wherein the presented content is manipulated through one or more of: customizing, analyzing, editing, selecting, moving, zooming, filtering, sorting, merging, and formatting of the presented content directly on the rendered web page; and
   displaying the presented content in a separate user interface associated with one of the suitable application and the selected application to enable manipulation through gestures, directly on the rendered web page.

2. The method of claim 1, wherein the presented content includes at least one from a set of: textual data, spreadsheet data, graphical data, and video data.

3. The method of claim 2, further comprising:
   detecting selection of a portion of the presented content on the rendered web page; and
   automatically presenting the web page behavior control (WPBC) menu in response to selection of the portion of the presented content, wherein the WPBC menu displays available applications for managing the selected portion of the presented content.

4. The method of claim 2, further comprising:
   detecting a unique gesture associated with the rendered web page; and
   upon detection of the unique gesture, one of: automatically activating a suitable application for managing the presented content and automatically presenting the web page behavior control (WPBC) menu.

5. The method of claim 2, further comprising:
   enabling at least one from a set of: a selection of a portion of the presented content and manipulation of the selected portion of the presented content through one or more gestures.

6. The method of claim 1, further comprising:
   enabling manipulation of at least one from a set of: published content presented on the web page, implied content available but not presented on the web page, and related content from a data store associated with the rendered web page through the one or more applications provided by the WPBC menu.

7. The method of claim 1, wherein activation of the WPBE control element is detected from one or more of: a tap action on the WPBE control element, a swipe action on the WPBE control element, an optically captured gesture, a touch-based gesture, a keyboard entry combination, a mouse input, a voice command, and a pen input.

8. The method of claim 1, wherein the one or more applications include one or more of: a word processing application, a spreadsheet application, a drawing application, a presentation application, a content aggregation application, and a browsing application.

9. The method of claim 1, further comprising:
   in response to display of the presented content in the separate user interface associated with the selected application, enabling manipulation of the presented content through gesture input on the separate user interface;
   in response to completion of the manipulation, saving modifications to the presented content; and
   displaying the modified content on the rendered web page.

10. A server for providing gesture based manipulation of presented content on a rendered web page through a client application, the server comprising:
   a memory;
   a processor coupled to the memory, the processor executing a web application providing a web page with a web page behavior enhancement (WPBE) control element to be rendered by the client application in conjunction with instructions stored in the memory, wherein the web application is configured to:
      enable a user to interact with a user interface associated with the web page through gesture input;
      upon detecting one of activation of the WPBE control element and selection of a portion of the presented content, present a web page behavior control (WPBC) menu displaying one or more applications for manipulating the presented content;
      present one or more actions to allow interactions with the web page, wherein the one or more action are determined based on one or more of capabilities of the web application, capabilities of the client application, a user preference associated with the web page, and a usage history associated with the web page;
      detect selection of an application from the WPBC menu through gesture input;
      activate the selected application for managing the presented content;
      transform a selected portion of the presented content to enable modification of the selected portion of the presented content directly on the web page with functionality of the selected application, wherein the presented content is manipulated through one or more of: customizing, analyzing, editing, selecting, moving, zooming, filtering, sorting, merging, and formatting of the presented content directly on the web page; and display the presented content in a separate user interface associated with the selected application to enable manipulation.

11. The server of claim 10, wherein the WPBE control element is associated with one of the entire web page and one or more portions of the presented content displayed on the web page.

12. The server of claim 10, wherein the WPBC menu is further displayed in response to detection of a predefined unique gesture associated with the web page.

13. The server of claim 12, wherein the web application is further configured to:
enable manipulation of at least one from a set of: published content presented on the web page, implied content available but not presented on the web page, and related content from a data store associated with the web page through one or more of: a word processing application, a spreadsheet application, a drawing application, a presentation application, a content aggregation application, and a browsing application provided by the WPBC menu.

14. The server of claim 10, wherein the web application is further configured to:
enable selection of two or more portions of the presented content concurrently;
upon detection of the selection of the two or more portions of the presented content, automatically present the WPBC menu displaying one or more applications for managing the selected portions of the presented content;
detect selection of an application from the WPBC menu; and
activate the selected application for manipulating the two or more selected portions of the presented content.

15. The server of claim 14, wherein the web application is further configured to enable the user to merge the two or more selected portions of the presented content.

16. A computer-readable storage medium with instructions stored thereon for providing gesture based manipulation of presented spreadsheet content on a rendered web page, the instructions comprising:
upon detecting one of: activation of an embedded web page behavior enhancement (WPBE) control element, selection of a portion of the presented spreadsheet content displayed on the rendered web page, and a unique gesture associated with the rendered web page through gesture input, automatically presenting a web page behavior control (WPBC) menu displaying one or more applications for managing the presented spreadsheet content displayed on the rendered web page;
presenting one or more actions to allow interactions with the rendered web page, wherein the one or more actions are determined based on one or more of capabilities of a web application that presents the rendered web page, capabilities of a browser application that renders the rendered web page, a user preference associated with the rendered web page, and a usage history associated with the rendered web page;
detecting selection of an application from the WPBC menu;
enabling manipulation of the presented spreadsheet content through gesture input on one of the rendered web page and a separate user interface of the application selected from the WPBC menu; and
transforming a selected portion of the presented spreadsheet content to enable modification of the selected portion of the presented spreadsheet content directly on the rendered web page with functionality of the selected application, wherein the presented spreadsheet content is manipulated through one or more of: customizing, analyzing, editing, selecting, moving, zooming, filtering, sorting, merging, and formatting of the presented spreadsheet content directly on the rendered web page.

17. The computer-readable storage medium of claim 16, wherein the instructions further comprise:
enabling at least one from a set of: customizing, analyzing, editing, selecting, moving, zooming, filtering, sorting, merging, and formatting one or more rows and columns of the presented spreadsheet content.

18. The computer-readable storage medium of claim 16, wherein the presented spreadsheet content includes at least one from a set of: table data, chart data, and analysis data.

* * * * *